United States Patent [19]

Takahashi et al.

[11] Patent Number: 5,220,642
[45] Date of Patent: Jun. 15, 1993

[54] OPTICAL NEUROCOMPUTER WITH DYNAMIC WEIGHT MATRIX
[75] Inventors: Masanobu Takahashi; Shuichi Tai; Jun Ohta; Toshio Shinnishi; Kazuo Kyuma; Masaya Oita, all of Amagasaki, Japan
[73] Assignee: Mitsubishi Denki Kabushiki Kaisha, Japan
[21] Appl. No.: 513,602
[22] Filed: Apr. 24, 1990
[30] Foreign Application Priority Data Apr. 28, 1989 [JP] Japan .................. 1-111722
[51] Int. Cl.⁵ .......................... G06F 15/347
[52] U.S. Cl. ................... 395/25; 364/822; 364/807
[58] Field of Search ............ 364/513, 713, 822, 837, 364/845; 395/25; 357/19

[56] References Cited

U.S. PATENT DOCUMENTS

| 3,686,661 | 8/1972 | Sharpless | 340/324 R |
|---|---|---|---|
| 3,739,371 | 6/1973 | Hulyer | 340/324 |
| 3,845,241 | 10/1974 | Schwartz | 173/7.3 D |
| 4,011,558 | 3/1977 | Sharpless | 340/324 M |
| 4,283,659 | 8/1981 | Beckerman et al. | 315/161 |
| 4,654,649 | 3/1987 | Kojima et al. | 340/719 |
| 4,707,692 | 11/1987 | Higgins et al. | 340/805 |
| 4,771,278 | 9/1988 | Pooley | 340/780 |
| 4,772,886 | 9/1988 | Hasegawa | 340/825.82 |
| 4,809,204 | 2/1989 | Dagenais et al. | 364/713 |
| 4,849,940 | 7/1989 | Marks, II et al. | 365/215 |
| 4,860,253 | 8/1989 | Owechko et al. | 365/125 |
| 4,910,571 | 3/1990 | Kasahara et al. | 357/30 |
| 4,939,682 | 7/1990 | Falk | 364/713 |
| 4,995,088 | 2/1991 | Farhat | 382/15 |
| 5,004,309 | 4/1991 | Caulfield et al. | 350/3.68 |
| 5,028,969 | 7/1991 | Kasahara et al. | 357/19 |
| 5,063,531 | 11/1991 | Kawai et al. | 395/25 |
| 5,093,875 | 3/1992 | Ogusa et al. | 385/17 |
| 5,095,459 | 3/1992 | Ohta et al. | 395/25 |

FOREIGN PATENT DOCUMENTS

| 2-59914 | 2/1990 | Japan . |
|---|---|---|
| 2-59915 | 2/1990 | Japan . |
| 2-59916 | 2/1990 | Japan . |
| 2-61708 | 3/1990 | Japan . |

OTHER PUBLICATIONS

Valentine, E. H., "Memory Systems Utilizing Light-Emitting Diodes and Photodetectors", IBM Technical Disclosure Bulletin, vol. 14, No. 12, May 1972, 3701-3702.
Takizawa et al., "Bistable Spatial Light Modulator (I) Analysis", Proceedings Applied Physics Association Meeting 1988, 734.
Takizawa et al., "Bistable Spatial Light Modulator (II) Experimental Results", Proceedings Applied Physics Assoc. Meeting 1988.
Ohta et al., "Associative Optical Neurocomputer", Electronic Info. Communication Society Opto-quantum Electronic Study Group, 39-45.
Millman, J., Microelectronics Digital & Analog Circuits & Systems, McGraw-Hill, 1979, 646.
Murray, A. F., "Pulse Arithmetic in VLSI Neural Networks", IEEE Micro, Dec. 89, pp. 64-74.
Farhat, N. H., "architectures For Optoelectronic Analogs of Self-organizing Neural Networks", Optics Letters, vol. 12, No. 6, Jun, 87, pp. 448-450.
Fahrat, N. H., "Optoelectronic Analogs of Self-programing Neural Nets:Architecture and Methodologies for Implementing Fast Stochastic Learning by Simulated Annealing", Applied Optics, vol. 26, No. 23, Dec. 1987, pp. 5093-5103.
Bell, D. A. Solid State Pulse Circuits, Reston Pub., 1981, 400-402.
Wagner et al., "Multilayer Optical Learning Networks", Digital Optical Computing, vol. 752, 1987, pp. 86-97.

Primary Examiner—Michael R. Fleming
Assistant Examiner—Robert W. Downs
Attorney, Agent, or Firm—Wolf, Greenfield & Sacks

[57] ABSTRACT

An optical computer for performing product and/or sum operations on input vector information and matrix information includes an array of light emitting elements, the array having a plurality of columns and a plurality of rows. Input circuitry is provided for supplying input vector information to the array while matrix circuitry is provided for dynamically applying matrix information to the array. Logic circuitry is provided for performing one of a logical product and a logical sum operation on the input vector information and the matrix information and for generating an output thereof.

19 Claims, 15 Drawing Sheets

FIG. 12 PRIOR ART
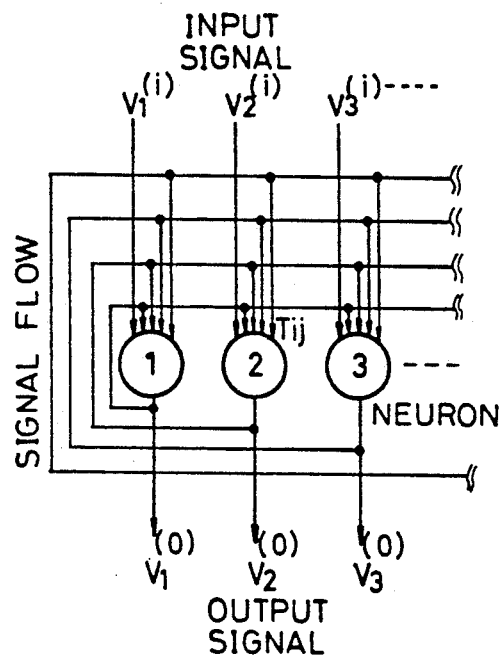
FIG. 13 A PRIOR ART
FIG. 13 B PRIOR ART
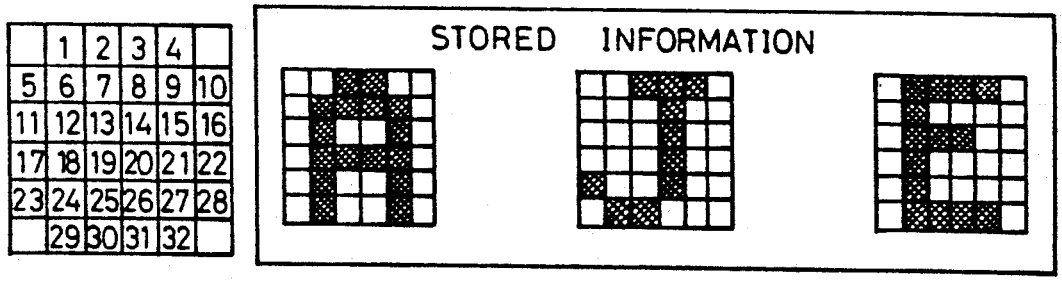

OPTICAL NEUROCOMPUTER WITH DYNAMIC WEIGHT MATRIX

BACKGROUND OF THE INVENTION

The present invention relates to optical computers which imitate nerve networks to realize a neurocomputer which has an association and/or pattern recognition function.

A conventional optical associative neurocomputer such as shown in *Denshi Joho Tsushin Gakkai Hikari-Ryoshielectronics Kenkyukai Shiryo OQE*87-174 (1988) [Electronic Information Communications Society Opto-Quantum Electronics Study Group Papers] is shown in FIG. 10. This optical neurocomputer consists of a pair of light emitting element (LEE) arrays 1a and 1b; a pair of optical masks 2a and 2b; a pair of light receiving element (LRE) arrays 3a and 3b; differential amplifiers 4; comparators 5; an incomplete information input 6; and a complete information output 7, all interconnected as shown.

In operation, the LEE arrays 1a and 1b emit fan-shaped light beams $V_j$ to the optical masks 2a and 2b. The respective light emitting elements of each LEE array 1a or 1b are turned on or off to represent a logic 1 or 0, thus representing a vector $V = (V_1, V_2, \ldots, V_i, \ldots, V_n)$. The optical masks 2a and 2b are divided into $N \times N$ elements each having a different light transmission factor, thus representing a matrix $T = [T_{ij}]$ (hereinafter "matrix $T_{ij}$"). Each LRE array 3a or 3b represents a vector $U = (U_1, U_2, \ldots, U_i, \ldots, U_n)$. When the j-th light emitting element emits light to the j-th row of the optical mask and the i-th light receiving element receives light from the i-th column of the optical mask, the following vector matrix operation is performed $$U_i = \sum_j T_{ij} V_j \qquad (1)$$

This operation will be described in more detail by using FIG. 10, wherein the matrix $T_{ij}$ has 25 $(=5 \times 5)$ elements, and the vector V five elements.

$$T_{ij} = \begin{bmatrix} T_{11} & T_{12} & T_{13} & T_{14} & T_{15} \\ T_{21} & T_{22} & T_{23} & T_{24} & T_{25} \\ T_{31} & T_{32} & T_{33} & T_{34} & T_{35} \\ T_{41} & T_{42} & T_{43} & T_{44} & T_{45} \\ T_{51} & T_{52} & T_{53} & T_{54} & T_{55} \end{bmatrix}$$

$$V_j = \begin{bmatrix} V_1 \\ V_2 \\ V_3 \\ V_4 \\ V_5 \end{bmatrix}$$

$$U_i = \begin{bmatrix} U_1 \\ U_2 \\ U_3 \\ U_4 \\ U_5 \end{bmatrix}$$

Substituting these into Eq. (1) gives $$\begin{bmatrix} U_1 \\ U_2 \\ U_3 \\ U_4 \\ U_5 \end{bmatrix} = \begin{bmatrix} T_{11} & T_{12} & T_{13} & T_{14} & T_{15} \\ T_{21} & T_{22} & T_{23} & T_{24} & T_{25} \\ T_{31} & T_{32} & T_{33} & T_{34} & T_{35} \\ T_{41} & T_{42} & T_{43} & T_{44} & T_{45} \\ T_{51} & T_{52} & T_{53} & T_{54} & T_{55} \end{bmatrix} \begin{bmatrix} V_1 \\ V_2 \\ V_3 \\ V_4 \\ V_5 \end{bmatrix} \qquad (2)$$

Transforming Eq. (2) gives $$\left. \begin{array}{l} U_1 = T_{11}V_1 + T_{12}V_2 + T_{13}V_3 + T_{14}V_4 + T_{15}V_5 \\ U_2 = T_{21}V_1 + T_{22}V_2 + T_{23}V_3 + T_{24}V_4 + T_{25}V_5 \\ U_3 = T_{31}V_1 + T_{32}V_2 + T_{33}V_3 + T_{34}V_4 + T_{35}V_5 \\ U_4 = T_{41}V_1 + T_{42}V_2 + T_{43}V_3 + T_{44}V_4 + T_{45}V_5 \\ U_5 = T_{51}V_1 + T_{52}V_2 + T_{53}V_3 + T_{54}V_4 + T_{55}V_5 \end{array} \right\} \qquad (3)$$

In Eq. (3), $U_i$ is expanded for i from 1 to 5. That is, for i=1, Eq. (1) is $$U_1 = \sum_{j=1}^{5} T_{1j} V_j \qquad (4)$$

Expanding Eq. (4) for j from 1 to 5 gives $$U_1 = T_{11}V_1 + T_{12}V_2 + T_{13}V_3 + T_{14}V_4 + T_{15}V_5 \qquad (5)$$

This is the same equation as the first one of Eq. (3).

In Eq. (5), $U_1$ is the sum of products of the respective elements ($T_{11}$, $T_{12}$, $T_{13}$, $T_{14}$, $T_{15}$) of the matrix $T_{ij}$ and the respective elements ($V_1$, $V_2$, $V_3$, $V_4$, $V_5$) of the vector V. That is, $U_1$ is determined by performing a product and sum operation on the respective elements $T_{ij}$ of the matrix $T_{ij}$ and the respective elements of the vector V. By repeating this up to $U_5$, the vector matrix operation on the matrix $T_{ij}$ and the vector V is performed.

The fact that the intensity of transmitted light depends on the light transmission factor of $T_{11}$ and the intensity of incident light $V_1$ makes the product operation $T_{11}V_1$ possible. Similarly, the respective products ($T_{12}V_2$, $T_{13}V_3$, $T_{14}V_4$, $T_{15}V_5$) are outputted from the optical mask 2a for the respective light transmission factors $T_{12}$, $T_{13}$, $T_{14}$, $T_{15}$ and the respective light intensities $V_2$, $V_3$, $V_4$, $V_5$. A light receiving element of the LRE array 3a collects these outputs to perform a sum operation for $U_1$. By repeating this up to $U_5$, the vector matrix operation is performed.

In contrast to the conventional Neumann type electronic computers which perform respective product operations and sum operations in sequence, the optical computer is able to perform an $N \times N$ matrix operations in parallel by applying and collecting light as described above. In addition, the computation time of the conventional electronic computer increases with the increasing number of matrix elements, but that of the optical computer remains constant in principle as far as the number of matrix elements is increased.

Before a neurocomputer is described, the function of a neuron will be described briefly with reference to FIGS. 11A–11C. Neurons are considered to be a nonlinear element having a multiple-input/single-output type threshold characteristic. That is, when the membrane potential which is determined by the sum of input signals is below a certain value (threshold value), the output of the neuron is 0 but, when the membrane potential is above the threshold value, it generates a pulse to send a signal to other neurons. There are two types of connection between neurons (synapse connection); i.e., an exciting connection which raises the membrane potential of the other neuron as shown by a black dot in FIG. 11B and a depressing connection which reduces the potential as shown by a white dot in FIG. 11B.

In a mathematical model, it is assumed that the output of a neuron has an analog value ranging from 0 to 1 according to the degree of excitation. The output of the i-th neuron, $U_i$, is approximately by the following equation $$U_i = g\left(\sum_{j=1}^{N} T_{ij} V_j + I_i\right) \quad (6)$$

wherein $V_j$ is the output of the j-th neuron connected to the i-th neuron (j=1, 2, . . . , N), $T_{ij}$ the strength of synapse connection, and $I_i$ the its own threshold value.

The positive and negative values of $T_{ij}$, which indicates the degree of an influence of the j-th neuron upon the i-th neuron, represent the exciting and depressing synapse connections, respectively. g is a monotonous saturation function such as a sigmoid function shown below $$g(x) = \frac{1}{2}\left[1 - \tan h\left(\frac{x}{x_0}\right)\right] \quad (7)$$

The function $g(x)$ is shown in FIG. 11C. If $x_0 \rightarrow >0$, then $g(x)$ asymptotically approaches a unit step faction. The energy of a network of these N neurons is given by $$E = -\frac{1}{2}\sum_{i,j=1}^{N} T_{ij} U_i V_j - \sum_{i=1}^{N} I_i U_i \quad (8)$$

As shown in FIG. 12, the network of neurons connected to each other, with the output signal of each neuron fed back to the other neurons, is called "feedback type model." In this model, there is no distinction between signal input neurons and signal output neurons. One representative example of this model is an associative memory. The associative memory herein used means any device which, when incomplete information, part of which is unclear or lost, is inputted, associates the incomplete information with the closest complete information which has been stored and outputs the complete information.

Now, let M be the number of pieces of complete information stored and V(m)=( V1(m), V1(m), . . . , V1(m)) be the binary vector (1, 0) for the neuron state with respect to the m-th complete information. If the correlational matrix $T_{ij}$, which represents the synapse connections, is defined by the Hopfield model as follows $$T_{ij} = \left.\begin{array}{ll} \sum_{m=1}^{M} (2Vi(m) - 1)(2Vi(m) - 1) & i \neq j \\ = 0 & i = j \end{array}\right\} \quad (9)$$

it is possible to prove the correspondence between the phenomenon that something has been stored and the stable state of a network or the minimum value of the energy E given by Eq. (8). Consequently, if the stored information is considered to be complete information, when a given incomplete information is inputted as a neuron state vector, the neuron state vector changes through the nonlinear threshold process of Eq. (6) and the feedback to the stored information which is closest to the inputted information so that the vector at the stable point is outputted. This is the principle of an associative memory.

In order to provide precise association, (1) the number of neurons, N, should be sufficiently larger than the number of pieces of information, M; (2) there should be no strong correlation between the respective storage condition vectors V(m) (m=1, 2, . . . , M); and (3) there should be orthogonality. Even if these conditions are met, the nonlinear process by a neuron makes the energy function E have many shallow local valleys or local minima as well as global minima which correspond to the stored information in the N dimensional vector space. The local minima even can trap the global minima under certain initial conditions. In the neurocomputer, information is stored as connection strengths $T_{ij}$ between respective neurons. These connection strengths $T_{ij}$ are stored as light transmission factors in terms of light. That is, in the optical associative neurocomputer, information is stored as transmission factors of the optical masks 2a and 2b. The information storage rules are based on the Hopfield model and given by Eq. (9) as follows $$T_{ij} = \sum_{m} (2Vi(m) - 1)(2Vj(m) - 1)$$

This will be described in more detail with reference to FIGS. 13A and 13B, wherein the connection strengths $T_{ij}$ are determined from the stored information. In FIG. 13A, if each of the letters A, J, and E is expressed by 32 elements in a 6×6 element arrangement except for the four corners, three pieces of the information stored about the letter A, J, and E are given by storage state vectors V(A), V(J), and V(E), respectively, as shown in FIG. 13B. Each vector has 32 binary states, wherein 0 and 1 represent white and black dots, respectively. Since N=32 and M=3, the connection strengths $T_{ij}$ are given by $$T_{ij} = \sum_{m=1}^{3} (2Vi(m) - 1)(2Vj(m) - 1)$$

For example, the connection strength $T_{11}$ is given by $$\begin{aligned} T_{11} &= \sum_{m=1}^{3} (2V1(m) - 1)(2V1(m) - 1) \\ &= (2V1(A) - 1)(2V1(A) - 1) + (2V1(J) - 1) \\ &\quad (2V1(J) - 1) + (2V1(E) - 1)(2V1(E) - 1) \\ &= (2 \cdot 0 - 1)(2 \cdot 0 - 1) + (2 \cdot 0 - 1)(2 \cdot 0 - 1) + \\ &\quad (2 \cdot 1 - 1)(2 \cdot 1 - 1) \\ &= 1 + 1 + 1 = 3 \end{aligned}$$

The value of $T_{ij}$ calculated in this way is either 0, +1 or +3 for all of i=1-32 and j=1-32. These values represent the connection strengths or transmission factors. The matrix $T_{ij}$ or optical masks 2a and 2b, which is made in the form of a 5×5 array in FIG. 10 for the purposes of simplicity, needs a 32×32 array in this example. As a result, the number of signal lines required for the LEE arrays 1a and 1b and the LRE arrays 3a and 3b is 32.

Since optical devices are unable to handle negative values, two optical systems are provided corresponding to the positive values $T_{ij}(+)$ and negative values $T_{ij}(-)$ of a matrix $T_{ij}$ as shown in FIG. 10. The difference in output between the LRE arrays 3a and 3b, $U_i$, is produced by the differential amplifier 4 as follows $$U_i = U_i(+) - U_i(-)$$

The output is subjected to a threshold process in the comparator 5 as follows $$V_i = \theta(U_i)\,\theta(U_i) = \begin{matrix} 1(U_i > I_i) \\ 0(U_i \leq I_i) \end{matrix}$$

The output is then fed back to the LEE arrays 1a and 1b. Thus, by storing the three of information in the optical masks 2a and 2b corresponding to the letters A, J, and E when incomplete information, such as A', is inputted to the LEE arrays 1a and 1b, the information about A closest to the inputted information about A' is displayed as a complete information output after repeating this feedback. In other words, the system energy takes the minimum value at the stored information about A, J, or E. When incomplete information is given, the entire system changes (the on/off state of the LEE array changes) so as to take the minimum value of energy around the inputted information. This is an associative function.

A basic optical system is shown in FIGS. 14A and 14B. The basic optical system includes a convex lens 26 and slits 27. The respective light beams from the LEE array 1a or 1b are made substantially parallel by the slits 27 and strike the optical mask 2a or 2b which makes a matrix T. The optical mask 2a or 2b is an ordinary emulsion type glass dry plate mask. The connection strength $T_{ij}$ is expressed in terms of the area of a portion through which light passes. The convex lens 26 collimates the light beams from the optical mask 2a or 2b and collects them on the LRE array 3a or 3b.

In the above conventional optical computer, information is stored as the transmission factors of the optical mask so that when the stored contents are to be changed, it is necessary to change the optical mask itself. That is, it is impossible to change information in a dynamic fashion. In addition, the light beam from the LEE array must be deflected in a fan shape and then collected on the LRE array so that a complex lens system is required.

SUMMARY OF THE INVENTION

Accordingly, it is an object of the invention to provide an optical computer which enables one to change the stored information in a dynamic fashion without using a complex lens system such as described above.

According to the invention there is provided an optical computer for performing a product and sum operation, which includes (a) an input unit for supplying input vector information; (b) a matrix unit for dynamically applying matrix information; and (c) an operation unit for performing a product and sum operation on said input vector information and said matrix information.

According to an embodiment of the invention there is provided an optical computer, which includes (a) a rectangular array of a plurality of bistable light emitting elements; (b) a row driver for generating a row signal corresponding to a row of the rectangular array; (c) a column driver for generating a column signal corresponding to a column of the rectangular array; (d) a overlapping unit for generating a product signal of the row signal and the column signal by overlapping one signal upon another at each element of the rectangular array so that each of the light emitting elements emits light based on the product signal; and (e) an array of light receiving elements for receiving light from the rectangular array to produce a product and sum signal.

Since the row driver sequentially inputs signals corresponding to neuron state vectors as an incomplete information input to a row of light emitting elements while the column driver inputs signals corresponding to respective columns of the matrix to respective columns of the light emitting elements in synchronism with the row signals and since the bistable light emitting element at which the logical product conditions are met is turned on so that the light emitting element corresponding to the optical transmittance of the optical mask is turned on, it is possible to dynamically change the interconnection strength and thus the matrix. In addition, with the row driver and the column driver, it is possible to make the electrode structure simpler and the manufacture easier.

According to another embodiment of the invention there is provided an optical computer, which includes (a) a rectangular array of light emitting elements; (b) a row signal unit for outputting a row signal corresponding to a row of the rectangular array; (c) an element signal unit for dynamically outputting an element signal corresponding to each element of the rectangular array; (d) an operation unit for receiving both of the row signal and the element signal and outputting a product signal of the row signal and the element signal to the rectangular array; (e) an array of light receiving elements for receiving light from a column of the rectangular array to produce a product and sum signal.

When a signal corresponding to the interconnection strength of a matrix and a signal corresponding to a neuron state vector are inputted to the operation unit which is connected to a light emitting element of the rectangular array, the light emitting element is turned on when the logical product conditions are met so that the light emitting element corresponding to the transmittance of an optical mask is turned on so that it is possible to dynamically change the matrix. The output signal is pulse modulated with the duty corresponding to the interconnecting strength or light intensity so that it is possible to continuously change the interconnecting strength between neurons corresponding to the transmittance of an optical mask and that it is easy to provide a learning function.

According to still another embodiment of the invention there is provided an optical computer, which includes (a) a first rectangular array of light emitting elements; (b) a second rectangular array of light emitting/receiving elements, each of which is switchable to either a light emitting element or a light receiving element; (c) a bistable spatial light modulator placed between the first rectangular array and the second rectangular array; (d) a recording unit for dynamically recording optical transmittance data in the spatial light modulator by controlling light emission of the light emitting elements and light emitting/receiving elements so that the spatial light modulator controls its light transmission based on the optical transmittance data recorded therein; (e) a production unit for inputting a row signal sent by the first rectangular array to the spatial light modulator and generating an optical product signal of the row signal and the optical transmittance; and (f) a summation unit for receiving the optical product signal from the production means to the second rectangular array and generating a product and sum signal in a column of the light emitting/receiving elements.

The interconnecting strength matrix is stored in the bistable light modulator as transmittance data by controlling light emission of the light emitting elements. A signal corresponding to a vector is inputted to a row of the first rectangular array to emit light and perform a production operation on the interconnecting strengths recorded in the bistable spatial light modulator. A row of the second rectangular array is switched to the light receiving function to produce the sum of products.

In the above embodiments, at least one of the elements is integrated on a semiconductor substrate so that it is possible to provide a very small optical computer.

Other objects, features, and advantages of the invention will be apparent from the following description when taken in conjunction with the following drawings.

BRIEF DESCRIPTION OF THE DRAWINGS

FIG. 12 shows a feedback type model of a neuron network;

FIGS. 13A and 13B show three pieces of the information stored and their vectors;

DESCRIPTION OF THE PREFERRED EMBODIMENT

Figure 1:
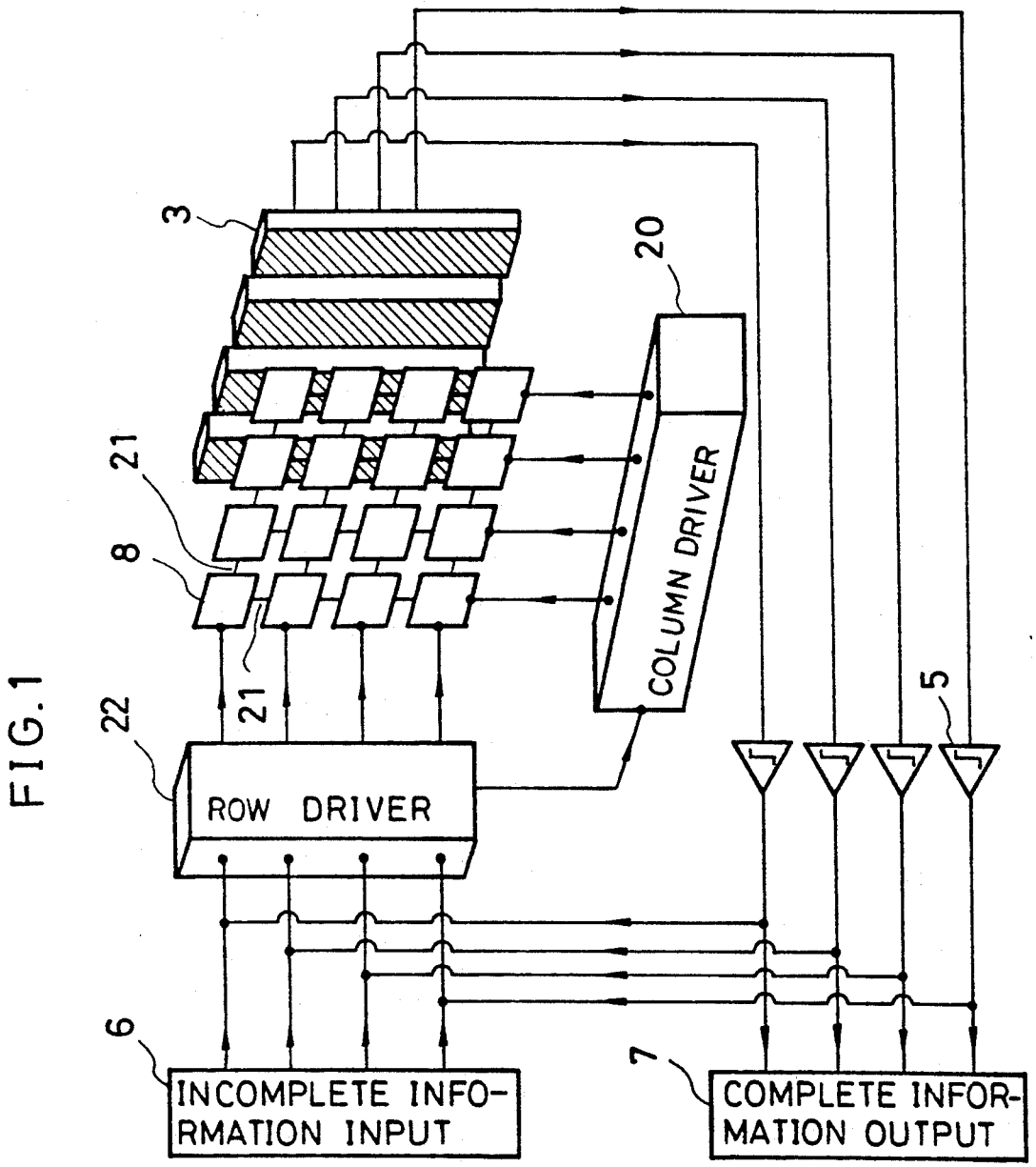
FIG. 1 is a schematic diagram of an optical neurocomputer according to an embodiment of the invention.

FIG. 1 shows an optical neurocomputer according to an embodiment of the invention, wherein only one optical system for the positive value $T_{ij}(+)$ or negative value $T_{ij}(-)$ of a matrix $T_{ij}$ is shown for the purposes of simplicity. The optical neurocomputer includes an LRE array 3; comparators 5; an incomplete information input (neuron state vector V) 6; a complete information output 7; a bistable LEE rectangular array 8; a row driver 22 for outputting neuron state vectors in sequence; a column driver 20 for outputting respective column components of the matrix $T_{ij}$ in synchronism with the row driver; and signal electrodes 21, all interconnected as shown.

Figure 2:
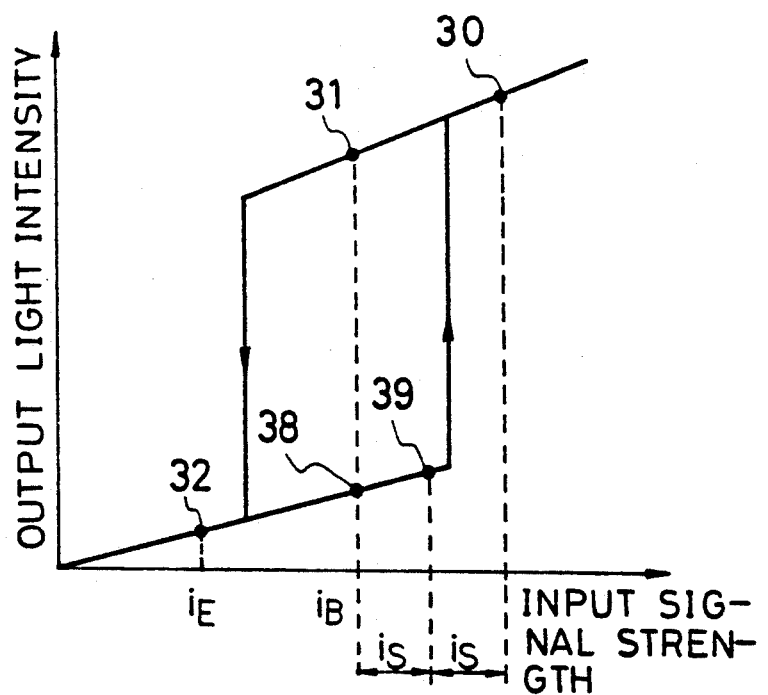
FIG. 2 is a graph showing the operation of a bistable light emitting element useful for the optical neurocomputer of FIG. 1.

FIG. 2 shows the characteristic of a light emitting element useful for the above LEE array 8, wherein the horizontal and vertical axes represent the strength of an input signal and the intensity of the emitted light, respectively. The bistable light emitting element is off at a signal strength 38 or the initial value $i_B$, and still off at a signal strength 39 which is $i_S$ higher than the initial value $i_B$. Then, it is on at a signal strength 30 which is higher than the initial value $i_B$ and still on at a signal strength 31 which is equal to the initial value $i_B$. Finally, it is off at a signal strength 32 or the reset value $i_E$.

In FIG. 1, the neuron state vector V and the transmittance of the matrix $T_{ij}$ are multiplexed on the bistable LEE array 8. That is, n rows and each element of the bistable LEE array 8 correspond to n light emitting elements and each element of the matrix $T_{ij}$, respectively.

Figure 3:
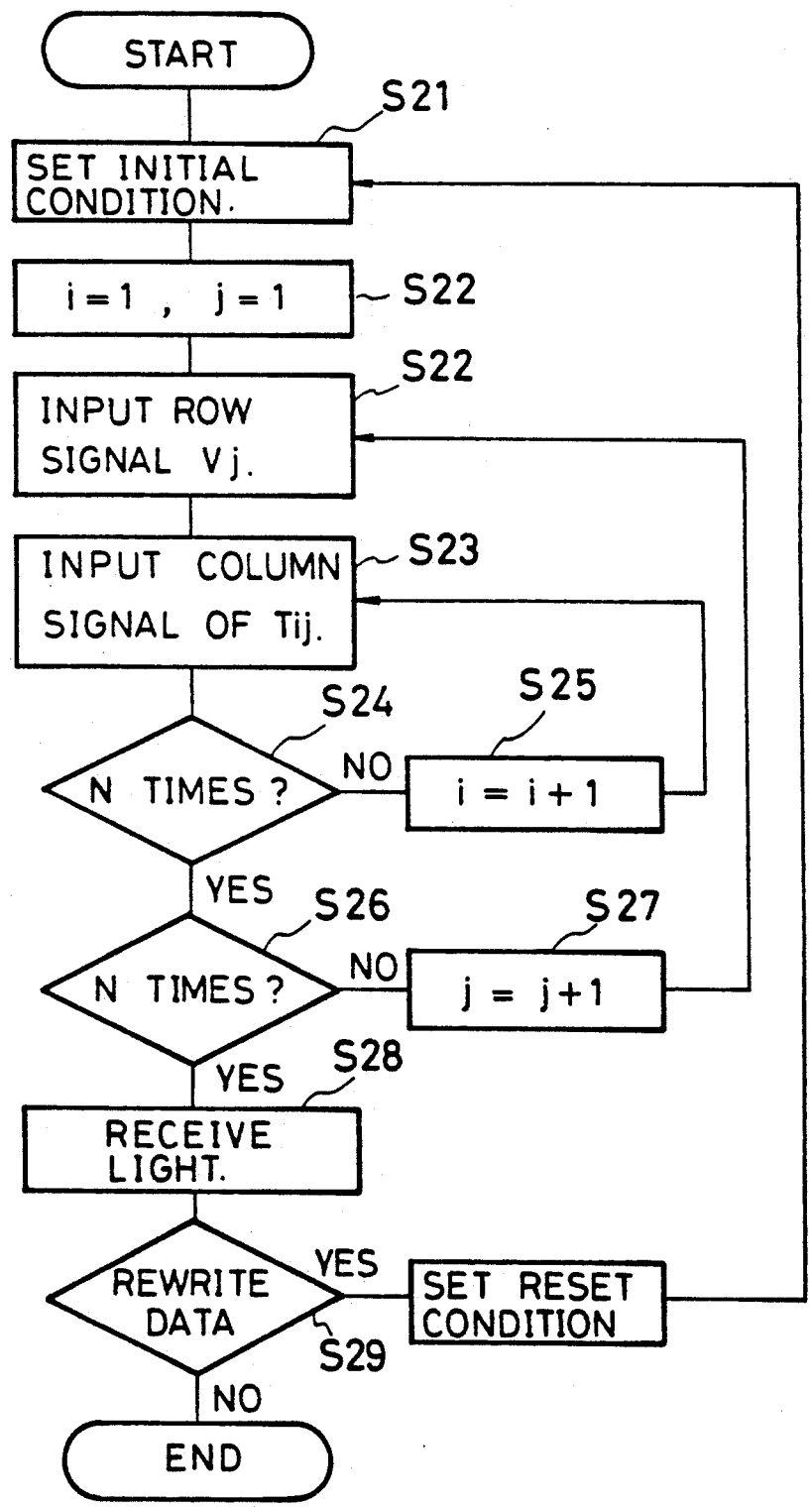
FIG. 3 is a flowchart showing the operational sequence of the optical neurocomputer of FIG. 1.

FIG. 3 shows the procedure how to retrieve the stored information by inputting incomplete information (neuron state vector V) into the bistable LEE array 8 in H which the connection strengths $T_{ij}$ have been stored corresponding to the stored information of the matrix $T_{ij}$. At a time $t_0$, each bistable light emitting element of the matrix 8 is put into the initial condition 38 in FIG. 2 (S21). At a time $t_1$, the row driver 22 inputs to the first row of the bistable LEE array 8 a binary signal which corresponds to the first component $V_1$ of the neuron state vector V (S22). As shown in FIG. 2, when $V_1$ is a logic 0, nothing is inputted so that each bistable light emitting element remains at the initial state 38, whereas when $V_1$ is a logic 1, a signal $i_S$ is inputted so that each bistable light emitting element is at the state 39. At the same time $t_1$, the column driver 20 inputs a binary signal which corresponds to the first column $T_{11}$ of the interconnecting matrix (S23). In this way, a binary signal corresponding to $T_{i1}$ (i=1, 2, ..., n) is inputted to the respective columns of the bistable LEE array 8 either simultaneously or sequentially for i from 1 to n (S24, S25). In FIG. 2, when $T_{i1}$ is a logic 0, nothing is inputted, whereas when $T_{i1}$ is a logic 1, a signal $i_S$ is inputted. Consequently, when $V_1 = 1$ and $T_{i1} = 1$, the bistable light emitting element is at the state 30 or on. When $V_1 = 1$ and $T_{i1} = 0$, or $V_1 = 0$ and $T_{i1} = 1$, the bistable LEE is at the state 39 or off. When $V_1 = 0$ and $T_{i1} = 0$, the bistable LEE is at the state 38 or off.

When the signals from the respective drivers 20 and 22 are removed, the bistable LEE in the on state 30 moves to the on state 31 and remains in the on state, while the bistable LEE in the off state 39 moves to the off state 38. That is, the on/off state is maintained. The above process is repeated up to the n-th row of the bistable LEE array 8 in sequence to turn on or off all the elements of the bistable LEE array 8 corresponding to the product $T_{ij}V_j$ (S26, S27). The on/off outputs from the light emitting elements are inputted to the light receiving elements (S28). Where the bistable LEE array 8 is changed after completion of the operation, the row driver 22 or the column driver 20 reduces the signal strength from $i_B$ to $i_E$ of the reset state 32 and then raises the signal strength to $i_B$ of the initial state 38.

Thus, the selection of a binary code outputted from the column driver 20 is comparable to the selection of a transmission factor of each element of the optical matrix according to the matrix $T_{ij}$ or the combination of the light emitting elements and the optical mask. That is, it is possible to change the stored information by merely changing the contents of a binary signal. In addition, the structure of electrodes 21 is so simple that it is easy to make it.

As has been described above, according to this embodiment there is provided an optical neurocomputer which includes a bistable LEE array; a row driver for sequentially outputting a signal to the respective rows of the bistable LEE array corresponding to a neuron state vector V; a column driver for outputting either simultaneously or sequentially in synchronism with the row driver a signal to the respective rows of the bistable LEE array corresponding to a column of the matrix $T_{ij}$; a light receiving element array for receiving light outputted from the light emitting elements of each column of the bistable LEE array to provide a product and sum signal; and comparators in which the respective outputs from the light receiving element array are subjected to a threshold process.

Alternatively, the binary signal for the matrix $T_{ij}$ in the above embodiment may be a multiple value signal. The signal corresponding to incomplete information, which takes 0 and 1 in the above embodiment, may take multiple values. In this case, the row and column drivers generate multiple value signals, and the bistable LEE array determines the intensity of output light according to the multiple value, and the light receiving element array changes its output according to the output light intensity. The feedback type associative function in the above embodiment may be replaced by a feedforward type function such as back propagation.

Figure 4:
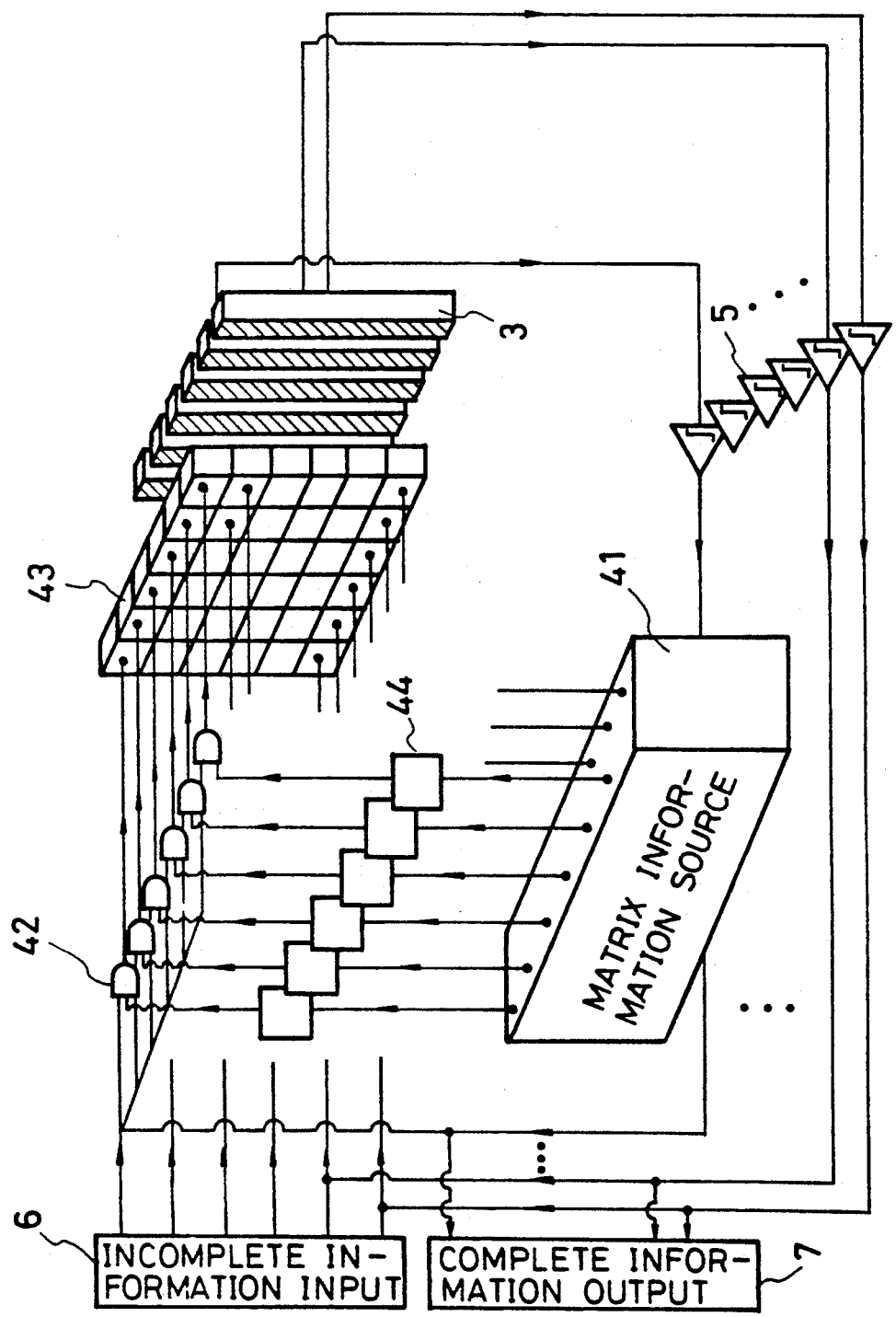
FIG. 4 is a schematic diagram of an optical neurocomputer according to another embodiment of the invention.

FIG. 4 shows an optical neurocomputer according to another embodiment of the invention, wherein only one optical system of the optic neurocomputer corresponding to the positive or negative value $T_{ij}(+)$ or $T_{ij}(-)$ of the matrix $T_{ij}$ is shown for the purposes of simplicity. The optical neurocomputer consists of a light receiving element array 3; comparators 5; an incomplete information input (neuron state vector V) 6; a complete information output 7; AND gates as an operation means 42; a light emitting element rectangular array 43; a matrix information source as an element signal means 41; and pulse modulators 44, all interconnected as shown.

In operation, the neuron state vector V corresponding to the on/off of each light emitting element and the transmittance of the matrix $T_{ij}$ are multiplexed in the LEE array 43. That is, n rows and respective elements of the LEE array 43 correspond to n light emitting elements and respective elements of the matrix $T_{ij}$, respectively. The information to be stored corresponding to the matrix $T_{ij}$ is inputted in the LEE array 43, and the stored information is retrieved with the neuron state vector V as follows.

First of all, the matrix information source 41 outputs a binary signal, 1 or 0, to one of the two inputs of each AND gate 42 which is connected to a light emitting element of the LEE array 43. The selection of this binary signal is comparable to the selection of the transmission factor of each element of the optical mask according to the matrix $T_{ij}$ information. However, in this case, it is possible to change the stored information by merely changing the contents of the binary signal. After the binary signal inputted to the AND gate 42 determines the information to be stored, a binary signal corresponding to the neuron state vector V is inputted to the other input of the AND gates which are connected to a row of the LEE array 43. Consequently, some AND gates meet the logical product conditions and the others do not. Their outputs determine the on/off state of each light emitting element of the LEE array 43, and the light receiving elements receive the output light.

More specifically, when an element $V_i$ of the neuron state vector V is a logic 0, all the elements in the i-th row of the LEE array 43 are turned off. When $V_i$ is a logic 1, only the elements at a logic 0 in the i-th row of the LEE array 43 are turned off. This is comparable to the combination of light emitting elements and an optical mask.

However, the above matrix $T_{ij}$ information corresponding to the transmittance of an optical mask has only 0s and 1s. In order to enhance the function, it is necessary to enable the value of the matrix $T_{ij}$ to change continuously between 0 and 1. According to the invention, a variable duty pulse modulator 44 is connected between the matrix information source 41 and each AND gate as the additional operation means 42 so that a high or low pulse duty corresponds to a high or low connection strength. By continuously changing the duty of a signal inputted to an input of the AND gate 42, it is possible to continuously change the connection strength. If the bandwidth of an electronic circuit for processing the output signal of the light receiving elements is set at a frequency which is sufficiently lower than that of the modulated pulse, the output is averaged to provide a d-c signal having a strength which is proportional to the pulse duty.

As has been described above, according to this embodiment there is provided an optical neurocomputer for performing a product and sum operation on a neuron state vector V and a matrix $T_{ij}$, which includes a LEE rectangular array; AND gates for outputting a driving signal to each light emitting element; an input unit for inputting a signal corresponding to the neuron state vector V to an input of each of the AND gates; a second input unit for inputting a binary signal corresponding to the matrix $T_{ij}$ to the other input of each of the AND gates; pulse modulators in which the binary signal is subjected to a given duty pulse modulation; a LRE array for receiving light outputted from the light emitting elements in each column of the LEE rectangular array to provide a product and sum signal of the state vector V and the matrix $T_{ij}$; and comparators in which the output of each light receiving element is subjected to a threshold process.

Alternatively, the pulse modulators 44 may be connected between the AND gates 42 and the LEE rectangular array 43. The neurosystem of the feedback type associative function may be replaced by that of the feedforward type function such as back propagation.

Figure 5:
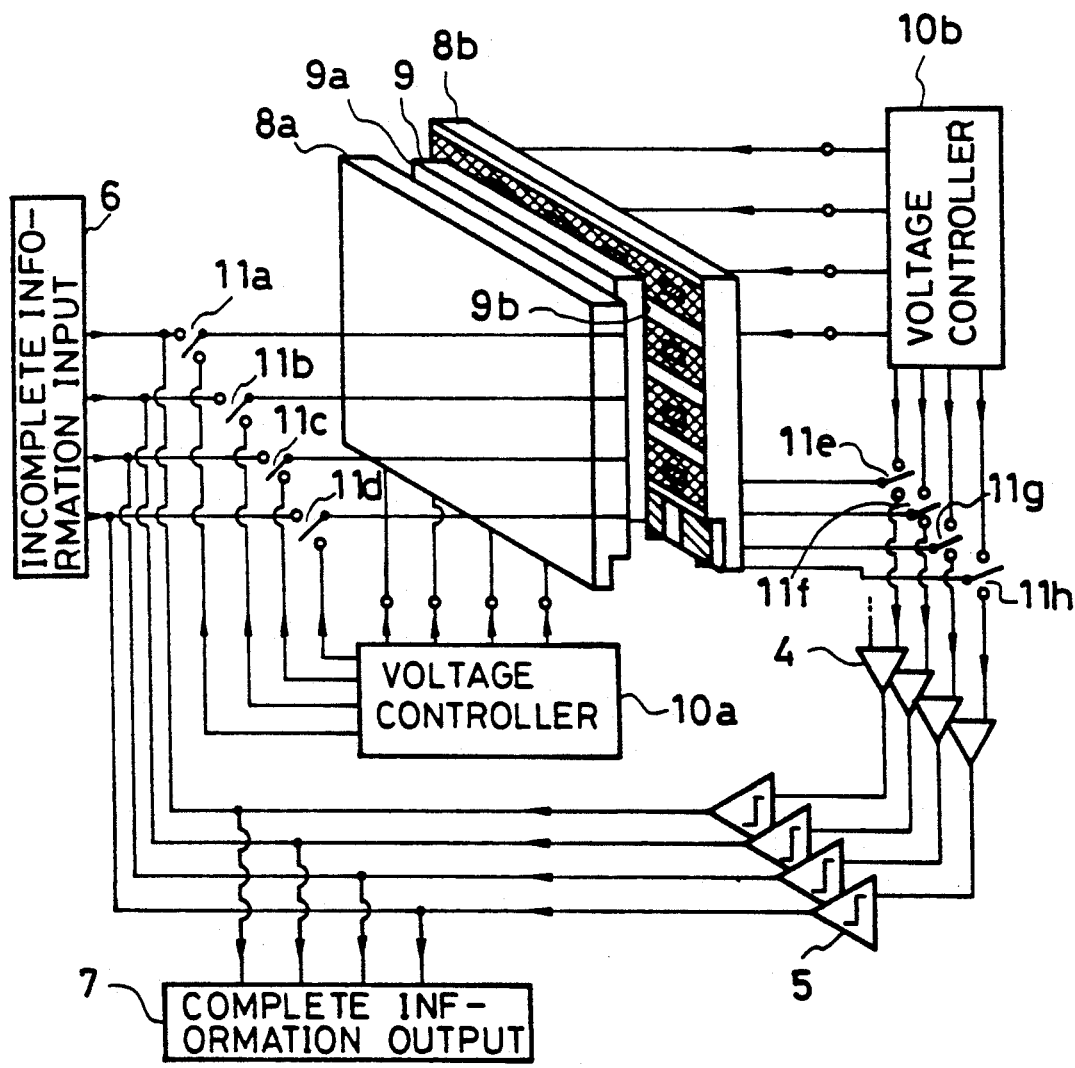
FIG. 5 is a schematic diagram of an optical neurocomputer according to still another embodiment of the invention.

FIG. 5 shows an optical neurocomputer according to still another embodiment of the invention, wherein only one optical system corresponding to the positive value $T_{ij}(+)$ or negative value $T_{ij}(-)$ of a matrix $T_{ij}$ is shown for the purposes of simplicity. The optic neurocomputer includes a pair of light emitting/receiving element (LE/RE) rectangular arrays 8a and 8b; a bistable spatial light modulator 9 with input/output surfaces 9a and 9b; a pair of voltage controllers 10a and 10b; and eight switches 11a-11h, all interconnected as shown.

Figure 6:
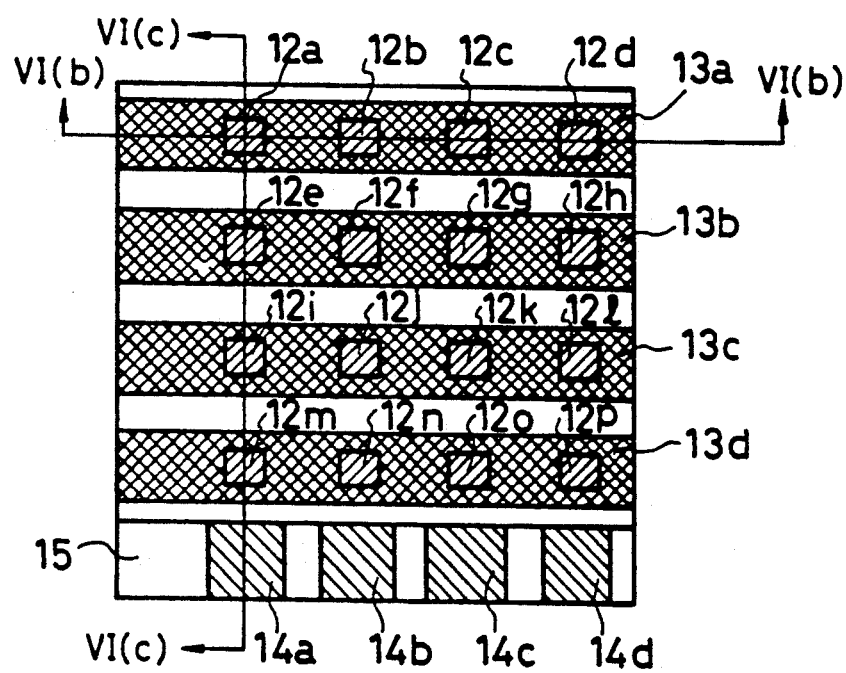
FIG. 6A is a top view of a light emitting/receiving element array useful for the optical neurocomputer of FIG. 5.
FIG. 6B is a sectional view taken along the line VI(b)—VI(b) of FIG. 6A.
FIG. 6C is a sectional view taken along the VI(c)—VI(c) of FIG. 6A.
Figure 6:
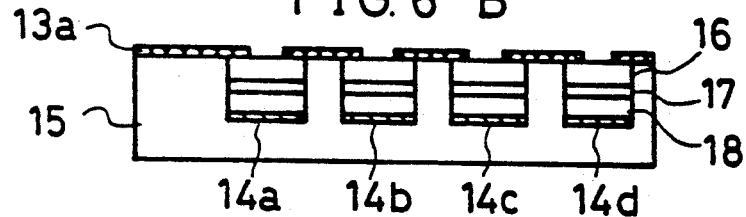
Figure 6:
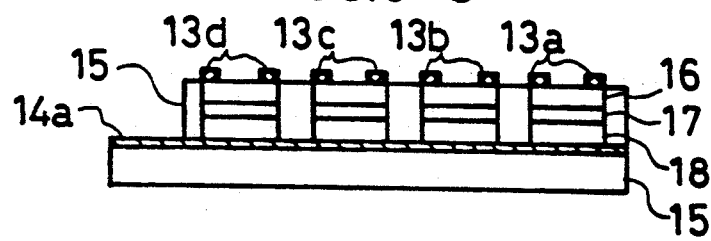

The LE/RE rectangular array 8a or 8b is shown in more detail in FIGS. 6A-6C. The array 8a or 8b has 16 light emitting/receiving elements 12a-12p which are arranged in a plane; four upper electrodes 13a-13d which are brought into contact with part of the upper surface of each row of light emitting/receiving elements such as 12a-12d; four lower electrodes 14a-14d which are brought into contact with the lower surface of each column of light emitting/receiving elements such as 12a, 12e, 12i, and 12m; an insulator 15; p layers 16; i (active) layers 17; and n layers 18.

Figure 7:
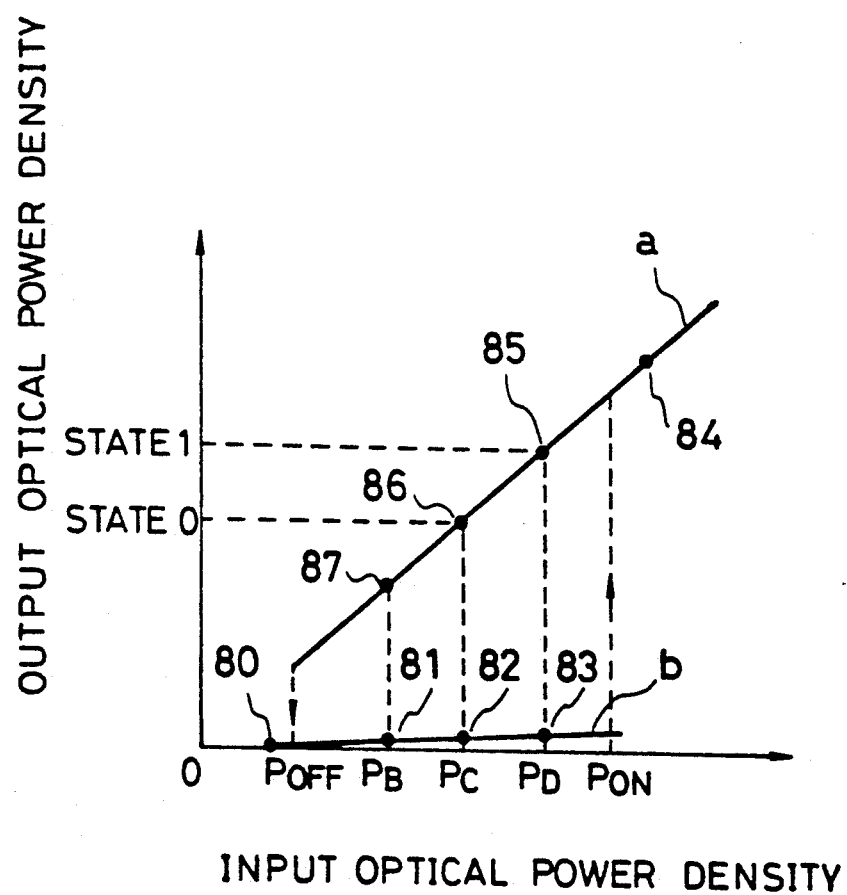
FIG. 7 is a graph showing the characteristic of a bistable spatial light modulator useful for the optical neurocomputer of FIG. 5.

FIG. 7 shows the characteristic of the bistable spatial light modulator 9 which is composed at least one element, with their light output surfaces bonded together such as described in *the 35 the Oyobutsurigaku Kankei Rengo Koenkai Koen Yokooshu, Vol.* 3, p. 734, 30p-ZF-3, p. 735, 30p-ZF-4 *(March* 1988) [Applied Physics Association Meeting Proceedings]. The spatial light modulator 9 shows the same characteristics as those of FIG. 2 with respect to incident light to the light input surface 9a and light output surface 9b. That is, the spatial light modulator 9 has two stable states; the on state in which light is transmitted and the operational point is in a line (a) and the off state in which little light is transmitted and the operational point is in a line (b). When the power density of incident light on the surface 9a is above $P_{ON}$, the spatial light modulator 9 is turned on, and when the input power density is below $P_{OFF}$, it is turned off.

Figure 8:
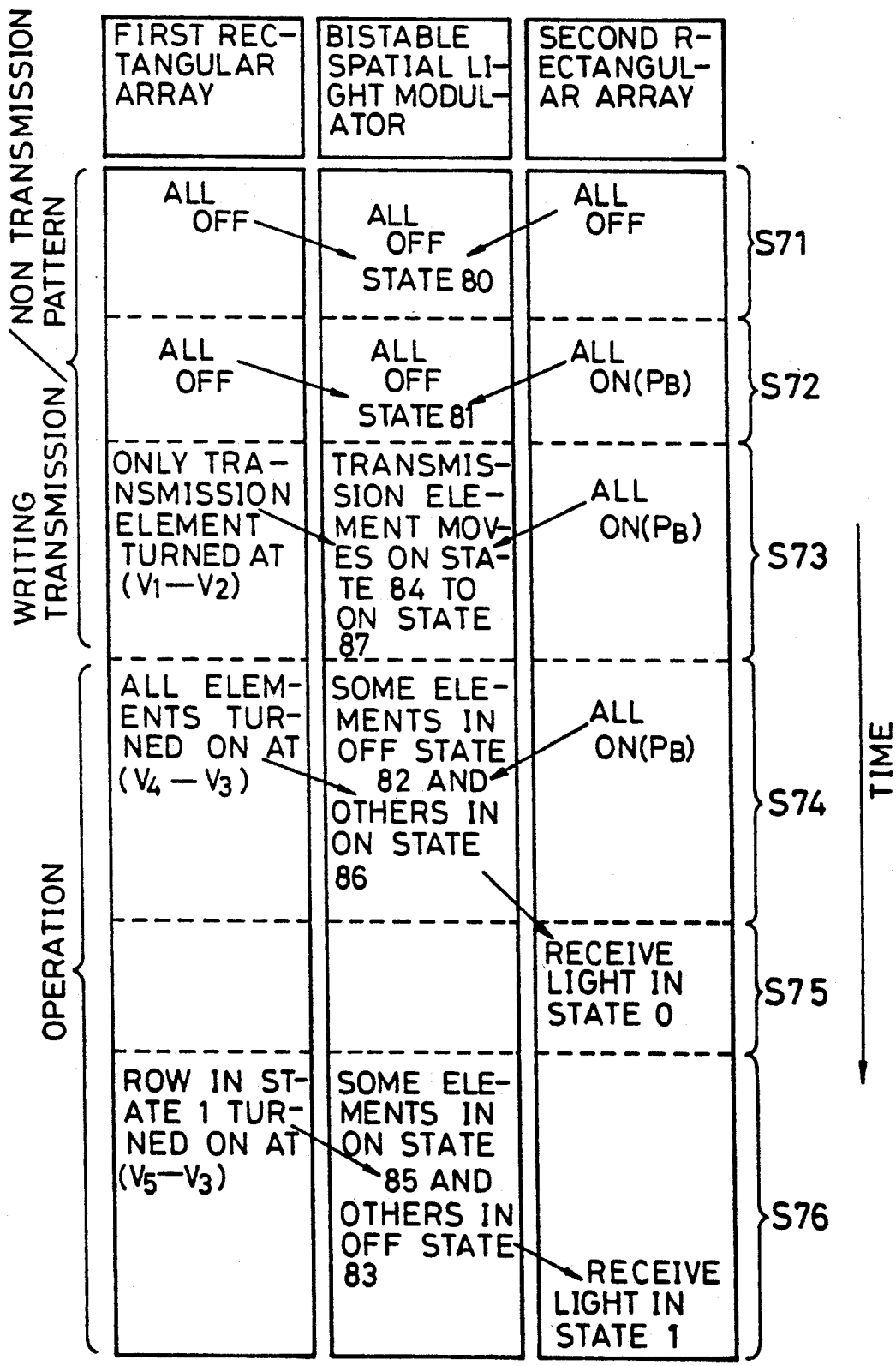
FIG. 8 is a flowchart showing the operational sequence of the optical neurocomputer of FIG. 5.

The operational sequence of this optical neurocomputer is shown in FIG. 8. First of all, it is necessary to write the matrix $T_{ij}$ information in the bistable spatial light modulator 9 as a transmission/non-transmission pattern. This is done as follows. First, all the switches 11a-11h are turned to the voltage controllers 10a and 10b. All of the upper electrodes 13a-13d and the lower electrodes 14a-14d of the LE/RE arrays 8a and 8b are put at equal potential to make the output power be zero so that the all surfaces of the spatial light modulator 9 are put into an off state 80 (S71). Then, the second voltage controller 10b makes the upper electrodes 13a-13d of the second LE/RE array 8b positive with respect to the lower electrodes 14a-14d to turn on all of the light emitting/receiving elements 12a-12p for applying light to the second i/o surface 9b with optical power density $P_B$ which is higher than $P_{OFF}$ but lower than $P_{ON}$ (S72). This puts the modulator 9 in the off state 81.

Based on the matrix $T_{ij}$ information to be stored, portions of the spatial light modulator 9 which are to be in the transmission state are sequentially put into the on state 84 (S73). For example, when a portion of the spatial light modulator 9 which corresponds to the light emitting/receiving element 12g of the first LE/RE array 8a is made transmissive, the first voltage controller 10a puts all of the upper electrode 13b and the lower electrodes 14a, 14b, 14d at an equal potential $V_1$ and all of the upper electrodes 13a, 13c, and 13d, and the lower electrode 14c at an equal potential $V_2$ ($V_2 < V_1$). At this point, only the light emitting/receiving element 12g among others emits light. The part opposite to the light emitting/receiving element 12g is put into the on state 84 or transmission state by setting the potential difference $(V_1-V_2)$ such that the power density of incident light on the i/o surface 9a is above $P_{ON}$. Once in the on state 84, it holds the on state 87 after the incident light is removed because the optical power $P_B$ which is higher than $P_{OFF}$ is inputted from the second i/o surface 9b. Thus, by sequentially turning on the light emitting/receiving elements of the first LE/RE array corresponding to the portion of the bistable spatial light modulator 9 which is to be transmissive, the interconnecting matrix information to be stored is written in the bistable spatial light modulator 9 as a transmission/non-transmission pattern (S73).

The operation of an optical associative neurocomputer working on the above principle will be described. For example, three pieces of information about A, J, and E are to be stored in the bistable spatial light modulator 9 as a connecting matrix information in the form of a transmittance pattern based on the Hopfield model. Then, the second LE/RE array 8b is turned on to apply light to the second i/o surface 9b with an optical power density higher than $P_{OFF}$ while the switches 11a-11d are turned to the incomplete information input 6 and the first voltage controller 10a puts all the lower electrodes 14a-14d at an equal potential $V_3$. Then, a potential $V_4$ ($V_4 > V_3$) for a state 0 is applied as an incomplete information input 6 to turn on all the light emitting/receiving elements 12a-12p of the first LE/RE array 8a (S74). The potential difference $(V_4-V_3)$ has been set so that the power density Pc of incident light on the portion of the first i/o surface 9a corresponding to the light emitting/receiving elements 12a-12p is higher than $P_{OFF}$ but lower than $P_{ON}$.

When the switches 11e-11h are turned to the differential amplifiers 4 while the second voltage controller 10b makes the potential of the upper electrodes 13a-13d on the second LE/RE array 8b lower than that of the lower electrodes 14a-14d so that the second LE/RE array 8b acts as an array of light receiving element columns. Although there is no incident light on the second i/o surface 9b, the incident light on the first i/o surface 9a holds the on state so that the transmission/non-transmission pattern written in the bistable spatial light modulator 9 is held in the state 86/state 82.

After passing through the bistable spatial light modulator 9, the optical power on the on state is received by the second LE/RE array 8b to produce a signal proportional to the sum of optical power inputted to each column, which is inputted to the differential amplifier 4 (S75). Since the state vector V of the incomplete information input 6 is (0, 0, 0, 0), the input to the differential amplifier 4 must be 0. For this reason, the differential amplifier 4 is adjusted so that its output is 0 to thereby remove any influence of the optical power Pc on the on state.

When a potential $V_5$ ($V_5 > V_4 > V_3$) is applied as an incomplete information input to the portion which corresponds to the state 1, all the light emitting elements in the corresponding row of the first LE/RE array 8a emit light (S76). If the potential difference $(V_{5-V_3})$ is set so that the power density $P_D$ of incident light on the first i/o surface 9a does not exceed $P_{ON}$, the transmission/non-transmission is held as a state 85/state 83 pattern. The subsequent signal process for providing an associative function is identical with the conventional one except that the output potentials of the comparators 5 corresponding to the states 0 and 1 are set at $V_4$ and $V_5$, respectively.

As has been described above, according to this embodiment there is provided an optical neurocomputer which includes a pair of LE/RE rectangular arrays consisting of a plurality of light emitting/receiving elements, rows of upper electrode placed on the top of the light emitting/receiving elements, and columns of lower electrode placed on the back of the light emitting/receiving elements; a bistable spatial light modulator placed between the LE/RE arrays; a pair of voltage controllers for applying separate potentials to the upper and lower electrodes; a plurality of switches for switching input and output signal lines; an array signal output unit for outputting binary signals corresponding to the neuron state vector V to respective rows of the LE/RE array; and a plurality of comparators in which the outputs from respective columns of the other LE/RE array are subjected to a threshold process.

Alternatively, the first LE/RE array 8a may be an array of only light emitting elements. The voltage controller and the switches may be replaced by any device which is able to turn on an array of light emitting elements with upper and lower electrodes.

Figure 9:
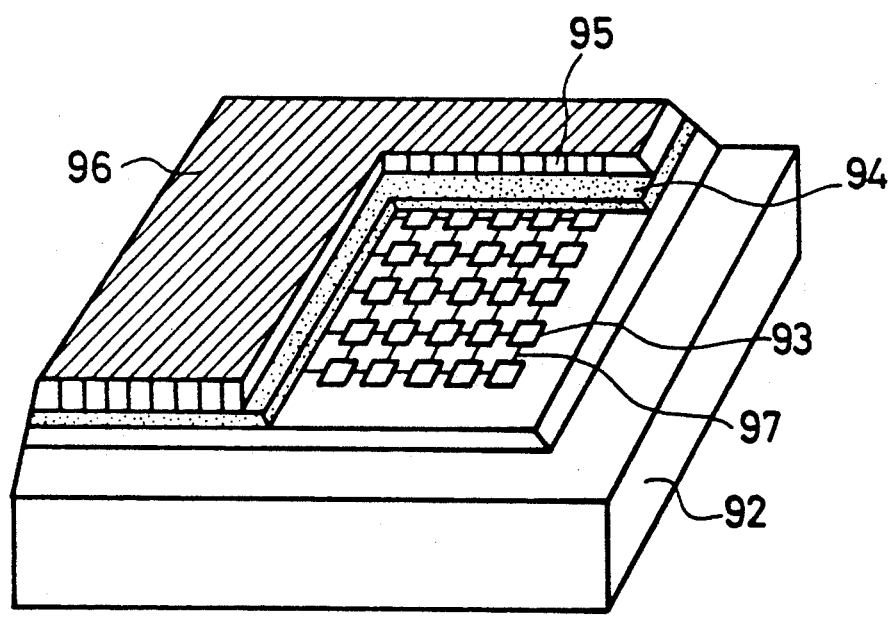
FIGS. 9A and 9B are perspective views of the optical systems useful for the optical neurocomputers of FIGS. 1 and 4, respectively.

The structure of an optical system for the optical computer of FIG. 1 is shown in FIG. 9A. The optical system consists of a semiconductor substrate 92; a rectangular array of bistable light emitting elements 93 formed on the substrate 92; signal electrodes 97 for interconnecting the light emitting elements 93; a clear insulating film 94 formed on the LEE array 93; and an array of light receiving elements 95 formed on the insulating film 94. The comparators 5 are either integrated with the optical system on the same substrate or made on a separate substrate and integrated with the optical system as a hybrid.

Figure 9B:
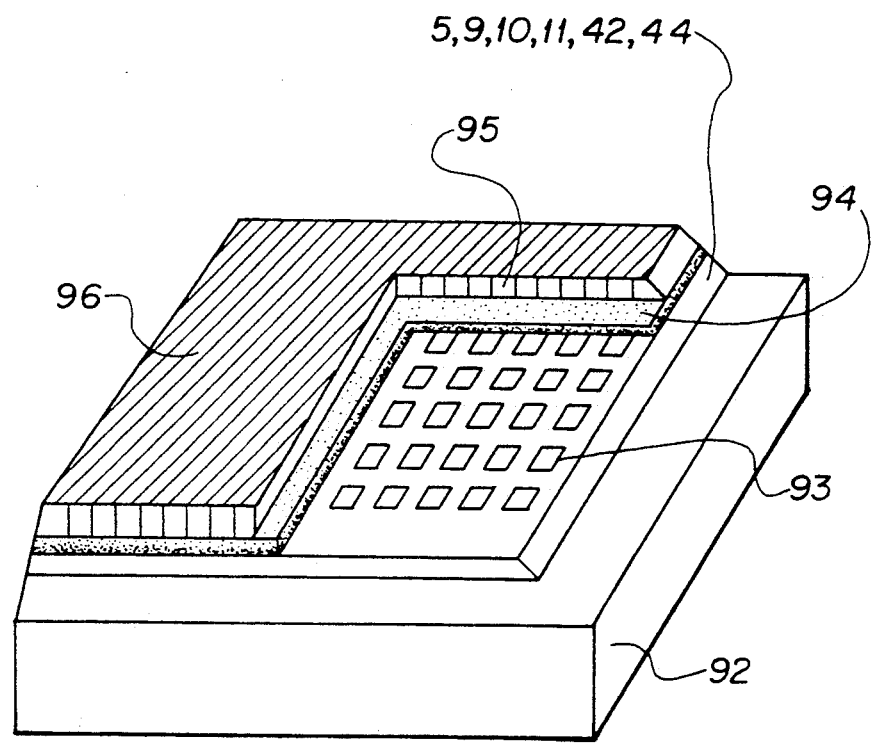
Figure 10:
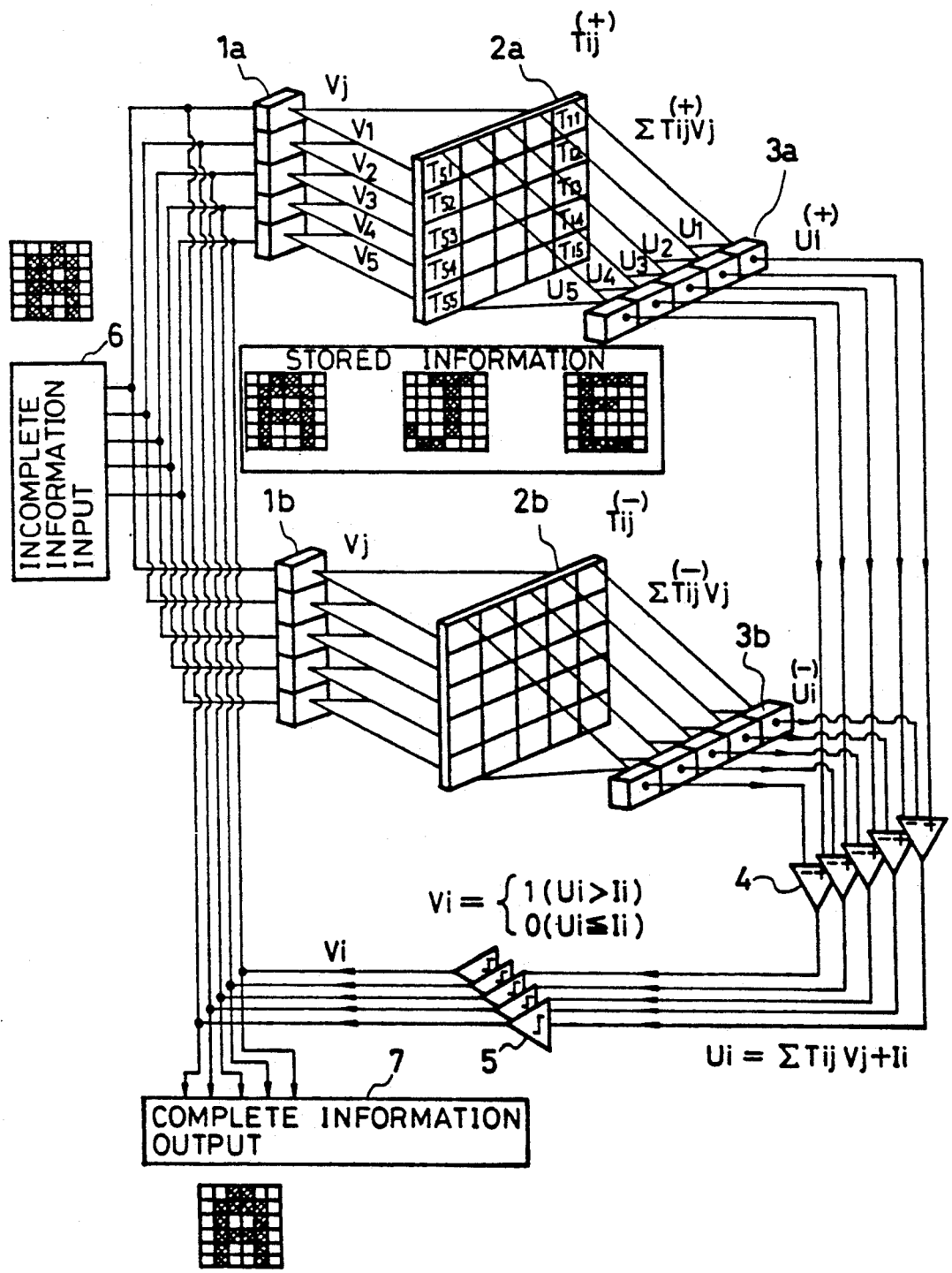
FIG. 10 is a schematic diagram of a conventional optical neurocomputer.
Figure 11:
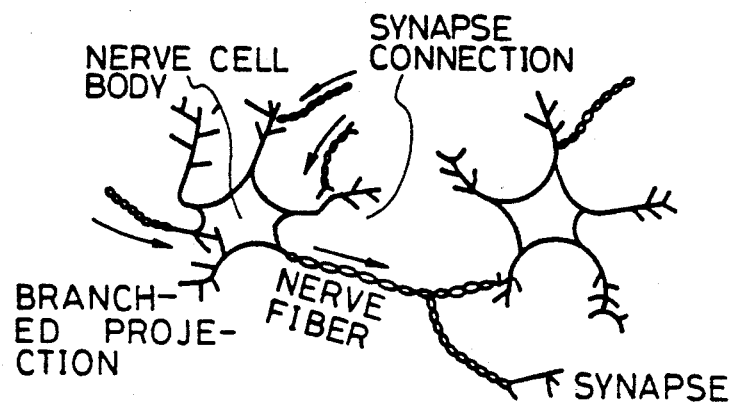
FIGS. 11A, 11B, and 11C show a neuron, its model, and its function, respectively.
Figure 11:
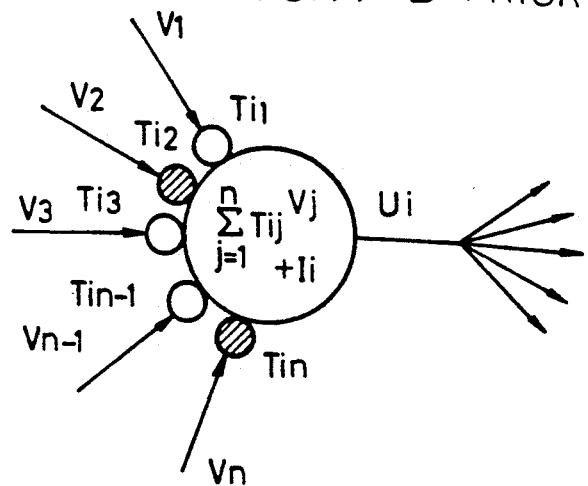
Figure 11:
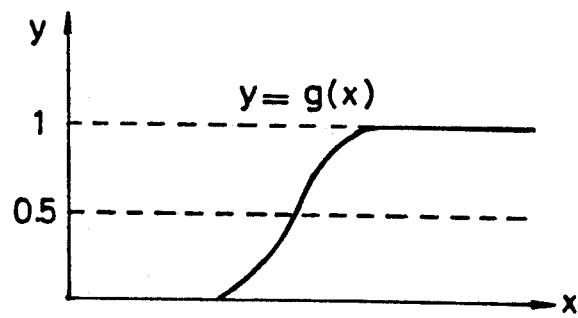
Figure 14:
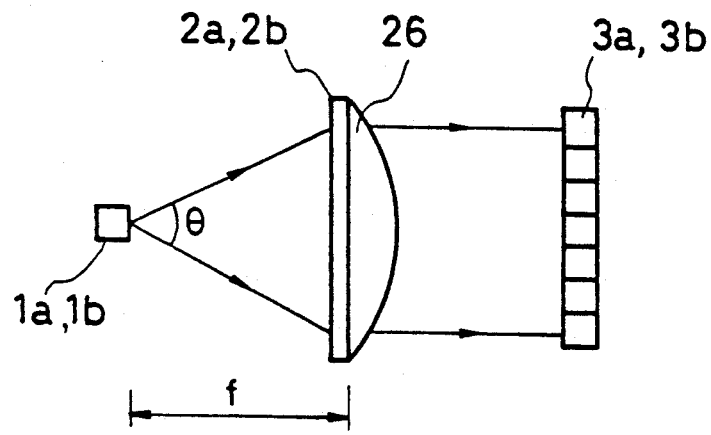
FIGS. 14A and 14B are top and side views of an optical system for the conventional optical computer.
Figure 14:
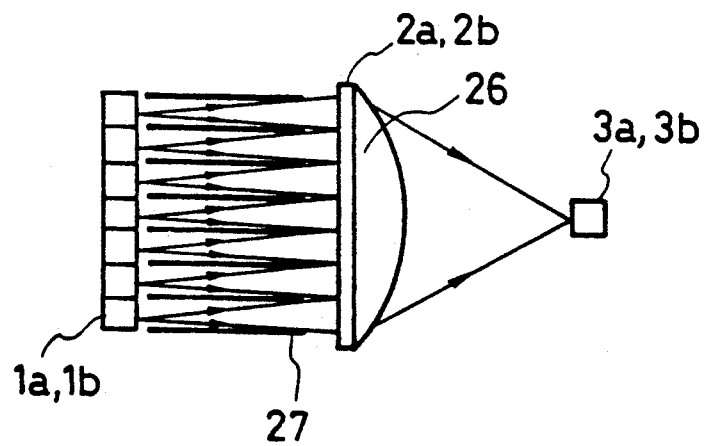
Figure 15:
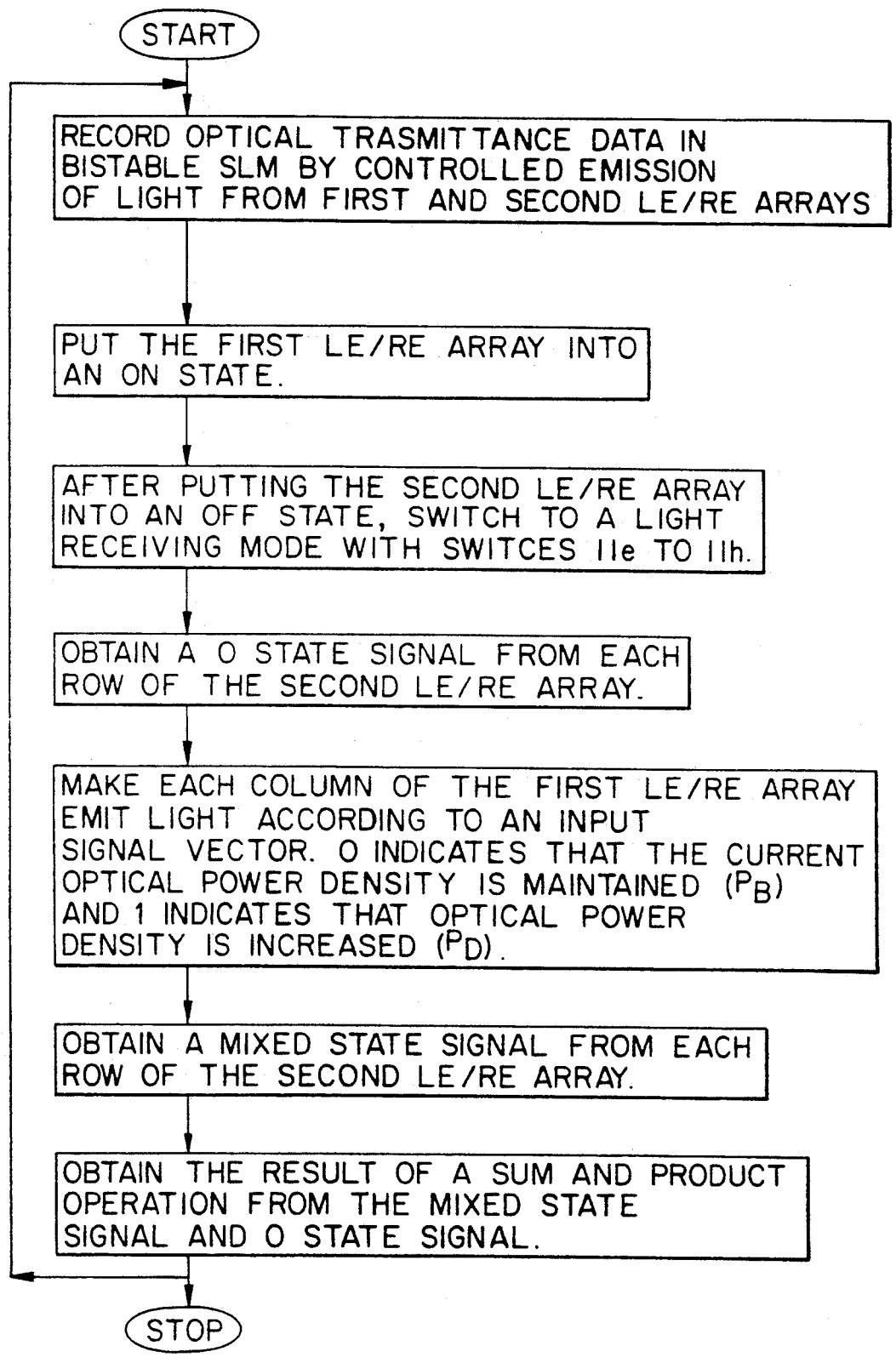
FIG. 15 is a flowchart showing the operation sequence for processing a sum and product operation using the optical neurocomputer of FIG. 5.

The structure of an optical system useful for the optical computer of FIG. 4 is shown in FIG. 9B. The optical system consists of a semiconductor substrate 92; a rectangular array of light emitting elements 93 formed on the substrate 92; a clear insulating film 94 formed on the LEE array 93; and an array of light receiving elements 95 formed on the insulating film 94. The comparators 5, the AND gates 42, and the pulse modulators 44 are either integrated with the optical system in the same substrate or integrated on a separate substrate and then integrated with the optical system as a hybrid.

Similarly, the optical system of FIG. 5 may be integrated on a semiconductor substrate.

In the above embodiments, the rows and columns are interchangeable. The size of the matrix $T_{ij}$, which is either $4 \times 4$ or $6 \times 6$ for simplicity, may be $N \times N$ wherein N is a given integer. The numbers of rows and columns may be different as $N_1 \times N_2$ wherein $N_1$ and $N_2$ are given different integers. The optical computer of the invention, which has been applied to the neurocomputer, may be applied to any computer which is able to perform a vector matrix operation.

In addition, by letting all of the $T_{ij}$ values be 1, it is possible to perform only a sum operation. Moreover, by inputting only a single row of values and the corresponding set of values of $T_{ij}$ it is possible to perform only a product operation. Thus, the optical computer according to the invention is not a mere dedicated system for performing a product and sum operation but is useful as an ordinary computer system which is able to perform a sum and/or product operation. It also be understood that the application of the invention is not limited to neurocomputers.

As has been described above, according to an aspect of the invention, the vector and the matrix $T_{ij}$ are multiplexed in a bistable LEE rectangular array so that it is possible to change the stored information by means of a simple optical system. Since the bistable LEE array outputs vectors in sequence, it is possible to make the electrode structure simpler and the manufacture easier. The optical system and the electronic circuitry are integrated on a single chip so that it is possible to provide a very small optical computer.

According to another aspect of the invention, the light emitting elements of a matrix $T_{ij}$ are modulated with given duty pulses in addition to the multiplex of a vector and a matrix $T_{ij}$ in the LEE rectangular array so that it possible to continuously change the output signal of the matrix $T_{ij}$ with a simple optical system and thus the stored information without difficulty. Since the optical system and the electronic circuitry are integrated on the same substrate, a very small optical computer is provided.

According to still another aspect of the invention, a bistable spatial light modulator is placed between the LEE rectangular array and the LE/RE rectangular array so that it is possible to dynamically change the state of a matrix $T_{ij}$ from the outside and change the stored information without difficulty. The complex lens system is made unnecessary, resulting in the simple optical system.

We claim:

1. An optical computer comprising:
   (a) a rectangular array of a plurality of bistable light emitting elements;
   (b) a row driver means for generating a row signal corresponding to a row of said rectangular array;
   (c) a column driver means for generating a column signal corresponding to a column of said rectangular array;
   (d) overlapping means for generating a product signal of said row signal and said column signal by overlapping one signal upon another at each element of said rectangular array so that each of said light emitting elements emits light based on said product signal; and
   (e) a receiving array of light receiving elements for receiving light from said rectangular array to produce a product and/or sum signal.

2. The optical computer of claim 1, wherein at least one of said rectangular array, row driver, column driver, overlapping means, and receiving array is integrated on a semiconductor substrate to produce a semiconductor chip product.

3. The optical computer of claim 1, wherein said rectangular array comprises:
   (a) a rectangular array of bistable light emitting elements each having two stable light emission modes with respect to an input signal in a predetermined range;
   (b) a row signal electrode for connecting all bistable light emitting elements arranged in a row and carrying said row signal outputted by said row driver; and
   (c) a column signal electrode for connecting all bistable light emitting elements arranged in a column and carrying said column signal outputted by said column driver.

4. An optical neurocomputer for performing a product and sum operation of a neuron state vector having a plurality of vector state signals and a interconnecting matrix consisting of a set of interconnecting signals, comprising:
   (a) a rectangular array of a plurality of bistable light emitting elements;
   (b) a row driver for sending each of said neuron state vector signals to a corresponding row of said light emitting elements;
   (c) a column driver for sending each of said interconnecting signals to a corresponding column of said light emitting elements;
   (d) overlapping means for generating a product signal of said neuron state vector signals and said interconnecting signals by overlapping one signal upon another at each element of said rectangular array so that each of said light emitting elements emits light corresponding to said product signal;
   (e) a receiving array of light receiving elements for receiving light from said rectangular array to produce a product and sum signal; and
   (f) feedback means having a threshold process, for receiving and subjecting said product and sum signal to said threshold process and feeding it back to said row driver.

5. The optical neurocomputer of claim 4, wherein at least one of said rectangular array, row driver, column driver, overlapping means, receiving array, and feedback means is integrated on a semiconductor substrate to form a semiconductor chip product.

6. A method of performing a product and/or sum operation on vector information and matrix information by using a rectangular array of bistable light emitting elements, comprising the steps of:
   (a) initializing all of said light emitting elements to an initial state;
   (b) sending a row signal corresponding to said vector information to each row of said light emitting elements;
   (c) dynamically sending a column signal corresponding to said matrix information to each column of said light emitting elements during said step (b) so that said row signal and said column signal activate a light emitting element at which both of said row signal and said column signal are active;
   (d) repeating said step (c) for all columns of said rectangular array;
   (e) repeating said steps (b) through (d) for all rows of said rectangular array; and
   (f) receiving light from a column of said light emitting elements to produce a product and sum signal.

7. An optical computer comprising:
   (a) a rectangular array of light emitting elements;
   (b) row signal generating means for outputting a row signal corresponding to a row of said rectangular array;
   (c) element signal generating means for dynamically outputting an element signal corresponding to each element of said rectangular array;
   (d) operation means for receiving said row signal and said element signal and outputting a product signal of said row signal and said element signal to said rectangular array;
   (e) a receiving array of light receiving elements for receiving light from a column of said rectangular array to produce one of a product and sum signal.

8. The optical computer of claim 7, wherein at least one of said rectangular array, row signal means, element signal means, operation means, and receiving array is integrated on a semiconductor substrate to form a semiconductor chip product.

9. The optical computer of claim 7, wherein said operation means comprises:
   (a) a pulse modulator for converting said element signal to a pulse signal having a duty determined by an intensity of said element signal; and
   (b) an AND gate for outputting a logical product signal of said row signal and said pulse signal to said light emitting element.

10. An optical neurocomputer for performing a product and sum operation on a neuron vector of a plurality of vector signals and an interconnecting matrix of a set of interconnecting signal, comprising:
    (a) a rectangular array of light emitting elements;
    (b) row signal generating means for outputting a row signal corresponding to a row of said light emitting elements;
    (c) element signal generating means for dynamically outputting an interconnecting signal corresponding to each element of said rectangular array;
    (d) means for receiving said row signal and said element signal and outputting a logical product signal to said rectangular array;
    (e) a receiving array of light receiving elements for receiving light from a column of said light emitting elements to produce a product signal; and
    (f) feedback means having threshold process, for receiving and subjecting said product signal to said threshold process and feeding it back to said row signal means.

11. The optical neurocomputer of claim 10, wherein at least one of said rectangular array, row signal means, element signal means, operation means, receiving array, and feedback means is integrated on a semiconductor substrate to form a semiconductor chip product.

12. An optical computer comprising:
    (a) a first rectangular array of light emitting elements;
    (b) a second rectangular array of light emitting/receiving elements, each of which is switchable to either a light emitting element or a light receiving element;
    (c) a bistable spatial light modulator placed between said first rectangular array and said second rectangular array;
    (d) first and second voltage controllers coupled, respectively, to said first and second rectangular arrays for dynamically recording optical transmittance data in said spatial light modulator by controlling light emission of said light emitting elements and light emitting/receiving elements so that said spatial light modulator controls its light transmission based on said optical transmittance data recorded therein;
    (e) production means for inputting a row signal sent by said first rectangular array to said spatial light modulator and generating an optical product signal of said row signal and said optical transmittance; and
    (f) summation means for receiving said optical product signal from said production means to said second rectangular array and generating a product and/or sum signal in a column of said light emitting/receiving elements, said summation means comprising a plurality of differential amplifiers for producing said sum signal and a plurality of comparators for producing said product signal.

13. The optical computer of claim 12, wherein at least one of said first rectangular array, second rectangular array, bistable spatial light modulator, recording means, production means, and summation means is integrated on a semiconductor substrate to form a semiconductor chip product.

14. The optical computer of claim 12, wherein said second rectangular array comprises:
   (a) a rectangular array of light emitting/receiving elements, each of which consists of a p layer, an i layer, and an n layer, placed one upon another in this order;
   (b) an upper electrode placed on top of a row of said light emitting/receiving elements to carry a signal to said row; and
   (c) a lower electrode placed on the back of a column of said light emitting/receiving elements to carry a signal to said column.

15. The optical computer of claim 12, wherein said light emitting elements are light emitting/receiving elements.

16. An optical neurocomputer comprising:
   (a) a first rectangular array of light emitting elements;
   (b) a second rectangular array of light emitting/receiving elements, each of which is switchable to either a light emitting element or a light receiving element;
   (c) a bistable spatial light modulator placed between said first rectangular array and said second rectangular array;
   (d) first and second voltage controllers coupled, respectively, to said first and second rectangular arrays for dynamically recording optical transmittance data in said spatial light modulator by controlling light emission of said light emitting elements and light emitting/receiving elements so that said spatial light modulator controls its light transmission based on said optical transmittance data recorded therein;
   (e) production means for inputting a row signal sent by said first rectangular array to said spatial light modulator and generating an optical product signal of said row signal and said optical transmittance; and
   (f) summation means for receiving said optical product signal from said production means to said second rectangular array and generating a product and/or sum signal in a column of said light emitting/receiving elements, said summation means comprising a plurality of differential amplifiers for producing said sum signal and a plurality of comparators for producing said product signal;
   (g) feedback means having a threshold process, for receiving and subjecting said product and sum signal from said summation means to said threshold process and feeding it back to said production means.

17. The optical neurocomputer of claim 16, wherein at least one of said first rectangular array, second rectangular array, bistable spatial light modulator, recording means, production means, summation means, and feedback means is integrated on a semiconductor substrate to form a semiconductor chip product.

18. A method of performing a product and/or sum operation of a binary vector, consisting of a state 0 and a state 1, and a matrix by using a bistable spatial light modulator placed between a first rectangular array of light emitting elements and a second rectangular array of light emitting/receiving elements and processing circuitry responsive to the second rectangular array, said bistable spatial light modulator having two stable modes; namely, an on state and an off state with respect to an input signal in a predetermined range, and both of said light emitting elements and said light emitting/receiving elements having two modes; namely, an on state and an off state, said method comprising the steps of:
   (a) dynamically recording optical transmittance data in said bistable spatial light modulator by controlling light emission of said light emitting elements and light emitting/receiving elements so that said bistable spatial light modulator controls its transmission light based on said optical transmittance data recorded therein;
   (b) setting all rows of said light emitting elements in the first rectangular array to an on state to emit light and setting all light emitting/receiving elements in said second rectangular array to an off state;
   (c) receiving light emitted from said first rectangular array with said second rectangular array and summing a column of said light to output a state 0 signal;
   (d) setting rows of said light emitting elements in either an off state or an on state corresponding to a state 0 of a state 1 of said vector;
   (e) receiving said transmission light emitted from said first rectangular array with said second rectangular array and summing a column of said transmission light to output a mixed state signal; and
   (f) differentiating, with said processing circuitry, said mixed-state signal and said state 0 signal.

19. A method of dynamically recording matrix information as optical transmittance data by using a bistable spatial light modulator placed between a first rectangular array of light emitting elements and a second rectangular array of light emitting/receiving elements, said bistable spatial light modulator having two stable modes; namely, an on state and an off state for an input signal in a predetermined range, and said light emitting elements and said light emitting/receiving elements having two modes; namely, an off state and an on state, said method comprising the steps of:
   (a) setting both of said first rectangular array and said second rectangular array in an off state to thereby set said bistable spatial light modulator in an off state;
   (b) setting said second rectangular array in an on state;
   (c) setting each element of said first rectangular array in an on or off state based on said matrix information so that an element of said bistable spatial light modulator is put in an on state when both of said light emitting element and said light emitting/receiving element are in an on state; and
   (d) holding said second rectangular array in an on state so that once it is put in an on state in said step (c), said bistable spatial light modulator keeps said on state.

* * * * *